(12) United States Patent
Cranna et al.

(10) Patent No.: US 8,113,100 B1
(45) Date of Patent: Feb. 14, 2012

(54) WOOD CUTTING BAND SAW BLADE

(75) Inventors: Mark T. Cranna, Somers, CT (US);
Darriel Miller, Woodbury, MN (US)

(73) Assignee: Irwin Industrial Tool Company,
Huntersville, NC (US)

( * ) Notice: Subject to any disclaimer, the term of this patent is extended or adjusted under 35 U.S.C. 154(b) by 926 days.

(21) Appl. No.: 09/695,951

(22) Filed: Oct. 25, 2000

(51) Int. Cl.
*B27B 33/06* (2006.01)
*B23D 61/12* (2006.01)
*B27B 33/02* (2006.01)

(52) U.S. Cl. ................. 83/851; 83/661; 83/835; 83/848
(58) Field of Classification Search .................... 83/661, 83/676, 788, 835, 837, 846–855, 663; 76/112
See application file for complete search history.

(56) References Cited

U.S. PATENT DOCUMENTS

| | | | |
|---|---|---|---|
| 603,128 A | 4/1898 | Clemson ......................... | 83/850 |
| 820,969 A | 5/1906 | Grelck ............................ | 83/851 |
| 2,071,618 A | 2/1937 | Ferrari et al. ................. | 144/376 |
| 2,270,776 A | 1/1942 | Thornton ........................ | 83/852 |
| 2,624,381 A | 1/1953 | von der Werth ............. | 423/667 |
| 2,637,355 A * | 5/1953 | Chapin ........................... | 83/850 |
| 2,714,317 A * | 8/1955 | Drake ............................. | 76/112 |
| 3,866,504 A | 2/1975 | Claesson et al. ................ | 83/852 |
| 3,990,334 A | 11/1976 | Mellgren ........................... | 83/56 |
| 4,031,793 A | 6/1977 | Miaskoff ........................ | 83/788 |
| 4,043,404 A | 8/1977 | Sorlie et al. .................... | 172/555 |
| 4,179,967 A * | 12/1979 | Clark ............................... | 83/846 |
| RE31,433 E * | 11/1983 | Clark ............................... | 83/846 |
| 4,603,613 A | 8/1986 | Wilson ............................. | 83/661 |
| 4,867,026 A * | 9/1989 | Henning et al. ................ | 83/835 |
| 4,958,546 A | 9/1990 | Yoshida et al. ................ | 83/848 |
| 5,016,356 A | 5/1991 | Trench ............................. | 30/393 |
| 5,331,876 A * | 7/1994 | Hayden, Sr. .................... | 83/661 |
| 5,410,935 A | 5/1995 | Holston et al. ................. | 83/851 |
| 5,425,296 A | 6/1995 | Kullmann et al. ............. | 83/846 |
| 5,440,960 A | 8/1995 | Sadahiro ........................ | 83/168 |
| 5,606,900 A | 3/1997 | Stoddard ........................ | 83/846 |
| 5,642,766 A | 7/1997 | MacCauley, III ............. | 144/329 |

(Continued)

FOREIGN PATENT DOCUMENTS

DE 100 30 168 * 1/2001

(Continued)

OTHER PUBLICATIONS

"Frost Tooth Gullet Design", Armstrong Saw Engineer, No. 139, 1991, 1-14.

(Continued)

*Primary Examiner* — Clark F. Dexter
(74) *Attorney, Agent, or Firm* — McCarter & English, LLP (57) ABSTRACT

A wood cutting band saw blade includes a cutting edge and a back edge, wherein the cutting edge is defined by a plurality of teeth spaced relative to each other. The plurality of teeth include a plurality of set teeth each having a tip, each defining a bend plane, and each including a shelf located at least partially between the tip and the bend plane for reducing saw dust passing to the kerf and accumulating on the band saw blade. Each of the set teeth may define a relief surface and a cutting surface where the relief surface extends from one side of the tip in a direction opposite that of the movement of the band saw blade and the cutting surface extends from another side of the tip. The shelf includes a shelf surface extending from the cutting surface and may terminate in a shelf tip.

49 Claims, 4 Drawing Sheets

U.S. PATENT DOCUMENTS

| | | | |
|---|---|---|---|
| 5,826,477 A | 10/1998 | Brewer, Sr. | 83/168 |
| 5,832,803 A * | 11/1998 | Hayden, Sr. | 83/661 |
| 5,868,058 A | 2/1999 | Senegas | 83/846 |
| 6,003,422 A | 12/1999 | Holston | 83/661 |
| 6,834,573 B1 * | 12/2004 | Nakahara | 83/851 |
| 2002/0124707 A1 * | 9/2002 | Izard | 76/112 |

FOREIGN PATENT DOCUMENTS

| | | | |
|---|---|---|---|
| GB | 2 354 480 | * | 3/2001 |
| JP | 6-716 | * | 1/1994 |
| JP | 6-717 | * | 1/1994 |
| JP | 2000-343325 | * | 12/2000 |
| JP | 2001-9634 | * | 1/2001 |
| JP | 2001-62629 | * | 3/2001 |

OTHER PUBLICATIONS

International Search Report, issued by the International Searching Authority/US in re. PCT/US01/51393 on May 28, 2002.

* cited by examiner

WOOD CUTTING BAND SAW BLADE

FIELD OF THE INVENTION

The present invention relates generally to saw blades and, more particularly, to wood cutting band saw blades having a tooth form configured to reduce saw dust passing to the kerf walls and to the side walls of the band saw blade.

BACKGROUND INFORMATION

It is desirable to minimize the amount of sawdust remaining on the kerf walls when cutting work pieces. For example, excessive saw dust remaining on wood products, such as pallets, will tend to collect in the eyes and/or breathing passages of workers handling the pallets. In addition, dust can be particularly problematic when cutting frozen wood, such as logs. In particular, the fast-moving blade creates friction that, in turn, heats the wood and allows the wood to release moisture. The moisture collects on the kerf walls and sides of the band saw blade, and binds the sawdust thereon into a glue-like mixture. Then, the glue-like mixture freezes when the blade exits the work piece, resulting in a frozen, hardened layer of saw dust on the side walls of the blade. The frozen layer of sawdust can cause unwanted vibrations in the saw blade, and if sufficiently thick, can cause the blade to fracture.

Figure 1:
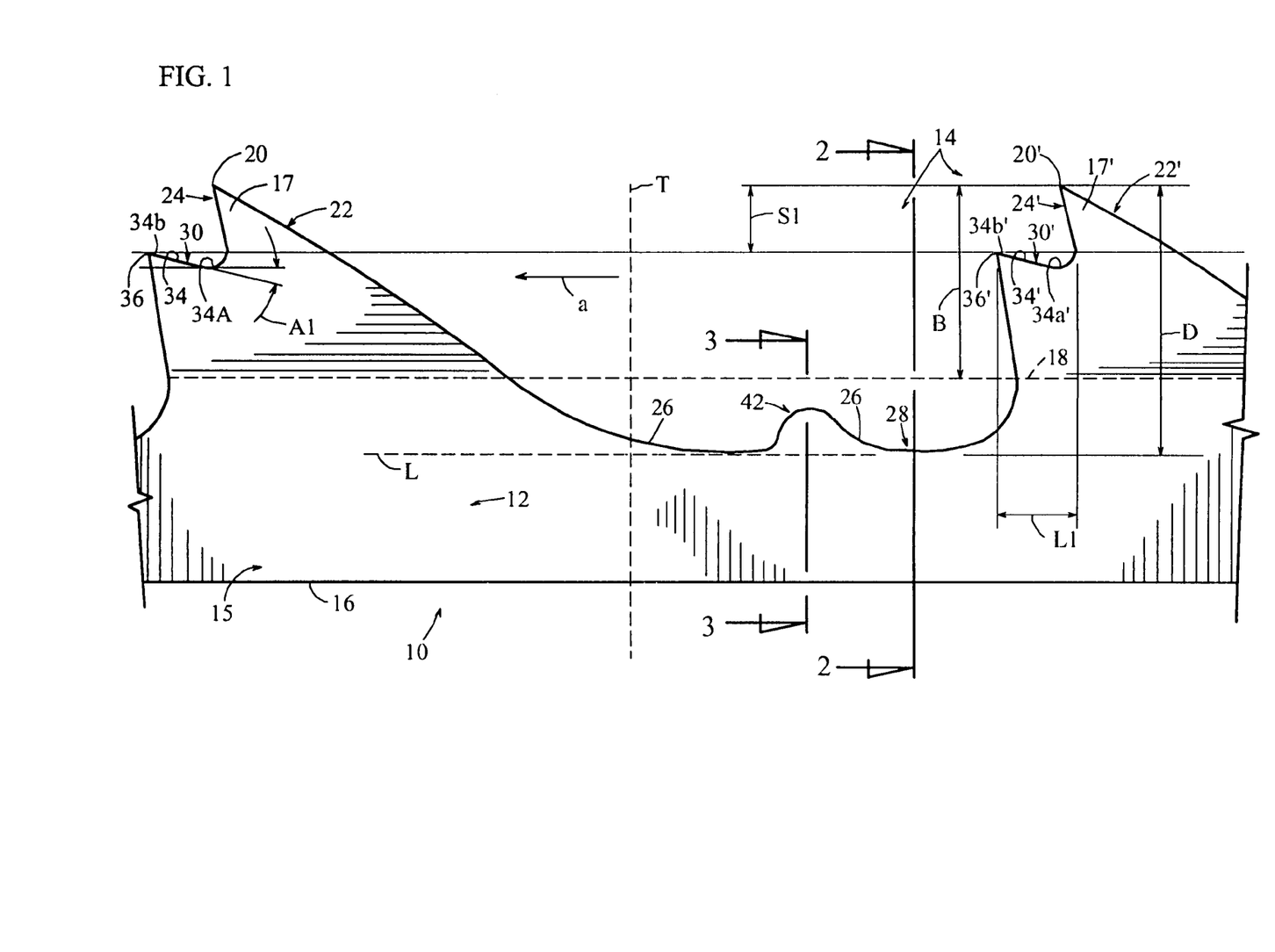
FIG. 1 is a side elevational view of a portion of a wood cutting band saw blade showing a pair of teeth comprising a shelf located between a tip and a bend plane in accordance with an embodiment of the present invention.
Figure 4:
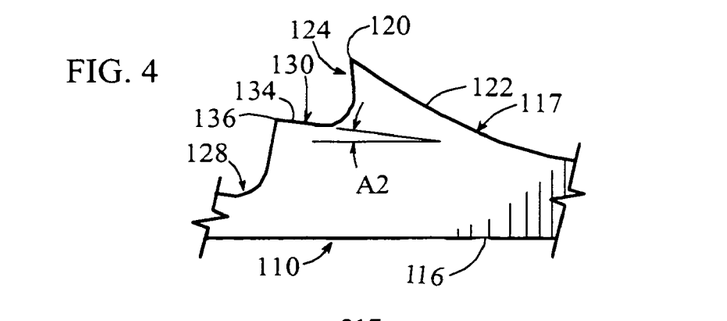
FIG. 4 is a side elevational view of a portion of a wood cutting band saw blade showing a single tooth having a generally linear shelf surface in accordance with another embodiment of the present invention.

U.S. Pat. No. 820,969 to Grelck ("Grelck") shows a woodcutting saw blade wherein the front of each tooth is provided with one or more projections which act as "sawdust-removers" to remove the sawdust as it is produced. More specifically, FIG. 1 shows a saw blade with each tooth "b" provided on its front or cutting edge and below its point with a projection "c". In FIG. 4, each tooth is provided with two such projections "c" and "d" spaced relative to each other. Grelck teaches that only the very end of the point of the tooth is set, and thus the bend plane of each tooth is spaced above the projections "c" and "d". Accordingly, saw dust which is created along the sides of the points that have been set is not captured by the projections "c" and "d" as they are below the bend plane. Instead, saw dust passes by either side of the projections in the direction of the kerf walls thereby building up and causing the above-described problems.

Accordingly, it is an object of the present invention to provide a saw blade which better reduces the quantity of saw dust collecting on the kerf walls.

It is also an object to overcome one or more of the above-described drawbacks and disadvantages of the prior art.

SUMMARY OF THE INVENTION

The present invention is directed to a wood cutting band saw blade that when cutting wood produces saw dust and forms a kerf. The band saw blade comprises a cutting edge defined by a plurality of teeth spaced relative to each other, and a back edge located on an opposite side of the band saw blade relative to the cutting edge. The plurality of teeth comprise a plurality of set teeth each having a tip, each defining a bend plane, and each comprising a shelf located at least partially between the tip and the bend plane for reducing saw dust passing to the kerf and accumulating on the band saw blade.

Preferably, each of the set teeth defines at least one relief surface and a cutting surface, where the relief surface extends from one side of the tip in a direction opposite that of the movement of the saw blade and terminating at one end of an intermediate surface, and the cutting surface extends from another side of the tip. Preferably, the shelf includes a shelf surface extending from the cutting surface and terminating at another end of the intermediate surface.

Another aspect of the present invention is directed to a wood cutting band saw blade having a lateral surface and generating dust during cutting of wood. The band saw blade comprises a base having a back edge and a cutting edge defined by a plurality of teeth spaced relative to each other and being located on an opposite side of the band saw blade relative to the back edge. The plurality of teeth comprise a plurality of set teeth, of which each set tooth defines a tip, a bend plane and a dust gap extending approximately between an outer lateral point of the tip and a lateral surface of the base. The band saw blade further comprises means for reducing the quantity of dust passing through the dust gap.

A further aspect of the present invention is directed to a wood cutting band saw blade having a lateral surface and generating dust during cutting of wood. The band saw blade comprises a base having a back edge and a cutting edge defined by a plurality of teeth spaced relative to each other and being located on an opposite side of the band saw blade relative to the back edge. The plurality of teeth comprise a plurality of set teeth, of which each set tooth defines a tip, a bend plane and a dust gap dimension extending approximately between an outer lateral point of the tip and a lateral surface of the base. The band saw blade further comprises means for reducing the dust gap dimension. In a preferred embodiment of the present invention, the means for reducing the dust gap dimension includes at least one shelf formed between the bend plane and the tip of a set tooth. In another embodiment of the present invention, the means for reducing the dust gap dimension further includes a relief portion extending from the tip of a set tooth at an acute angle to a transverse axis of the saw blade.

One advantage of the present invention is that the location of the shelf or like means for reducing the quantity of dust passing through the dust gap minimizes the collection of dust on both the kerf walls and sides of the saw blade.

Other advantages of the present invention will become readily apparent in view of the following detailed description of preferred embodiments and accompanying drawings.

DETAILED DESCRIPTION OF THE PREFERRED EMBODIMENTS

A wood cutting band saw blade in accordance with an embodiment of the present invention is illustrated generally at 10 in FIG. 1. The band saw blade 10 defines a cutting direction indicated by the arrow a, and comprises a band 12 having cutting edge 14 and a base 15 including a back edge 16. The band saw blade 10 defines a longitudinal axis "L" and a transverse axis "T". It will be appreciated by those of ordinary skill in the relevant art that the cutting edge 14 of the band saw blade 10 comprises a plurality of teeth 17, 17', 17"(FIG. 2) etc., disposed along the cutting edge. It will also be appreciated that all or a subset of the teeth 17, 17', 17", etc. may be angled or set along a bend plane 18 as better seen in FIG. 2.

Figure 2:
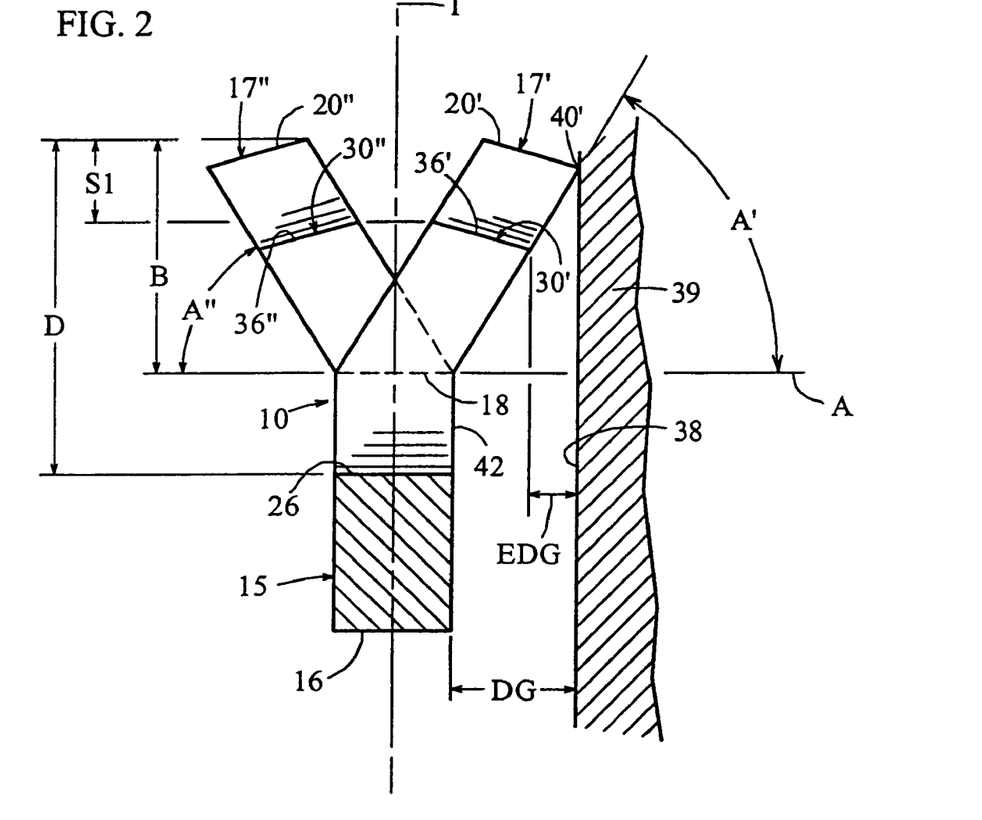
FIG. 2 is an enlarged cross-sectional view taken along line 2-2 of FIG. 1 showing a pair of teeth adjacent to a kerf wall.

Referring now to FIG. 2, a plurality of the teeth 17', 17", etc. are each set at an angle A', A", etc. relative to axis A. In the preferred embodiments of the present invention, angle A', A", etc. as preferably within a range of approximately 75-89°, and most preferably approximately 84° (or approximately 1° to approximately 15° with respect to transverse axis T). It will be understood that Angles A', A", etc. may also vary from tooth to tooth in a particular pattern. Also, each of the teeth 17', 17", may be set in a manner such that they extend in directions which alternate from one side of transverse axis T of the band saw blade 10 to the other side as illustrated in FIG. 2. In another example, the pattern may comprise both set teeth and unset or straight teeth. In a preferred embodiment, the pattern may include five teeth comprising a first unset tooth and four set teeth, the latter four of which alternate from one side of the transverse 20 axis T to the other side. Other patterns also may be employed in accordance with the present invention. For example, U.S. patent application Ser. No. 09/435,108 entitled "Band Saw Blade Having Reduced Noise and Uniform Tooth Loading Characteristics", assigned to the assignee hereof, and hereby incorporated herein by reference as part of the present disclosure, describes several tooth patterns that may include variously setting primary, secondary and tertiary teeth in such a manner as to minimize noise and vibration of the band saw blade.

Referring again to FIGS. 1 and 2, the teeth 17, 17' each comprise a tip 20, 20', a relief surface 22, 22', and a cutting surface 24, 24', and each tooth is separated from the next by an intermediate surface comprising a curvilinear base surface 26 defining a gullet 28. The relief surface 22, 22' and cutting surface 24, 24' each extend from the tip 20, 20', and preferably connect together with the curvilinear base surface 26 defining the gullet 28. It will be understood that the curvilinear base surface 26 may be configured in a particular shape that assists in discharging dust and chips created during cutting. Such a configuration is described, for example, in U.S. Pat. No. 6,167,792, entitled "Improved Tooth Form For A Saw Blade", assigned to the Assignee hereof, the entire contents of which is hereby incorporated herein by reference as part of the present disclosure.

In accordance with a feature of the present invention, each set tooth 17, 17', etc. defines a shelf 30, 30' extending from the cutting surface 24, 24' and comprising a shelf surface 34, 34' and a shelf tip 36, 36'. The shelf 30, 30' is configured to function, as described in more detail below, to collect saw dust, e.g. various sized wood chips and other particulate matter generated during cutting of a kerf including a kerf wall 38 in a work piece 39, as shown in FIG. 2, and to remove the collected dust away from the kerf wall 38. It will be recognized that the shelf tip 36, 36' may be of any suitable configuration including, e.g., a rounded configuration (not shown).

As used herein, the term shelf refers to any suitable structure which may capture and/or remove sawdust during cutting of a work piece such as, for example, a ledge-like structure extending outwardly from a cliff-like structure as illustrated in the disclosed embodiment.

It will be understood by one of ordinary skill in the pertinent art that the location and dimensions of the shelf 30, 30' affects the functionality of the shelf in removing dust. For simplicity, the following will use tooth 17' for an example in describing the location of the shelf 30'; however, it will be understood that this description may be equally applicable to all teeth disposed on the band saw blade 10. As shown in FIG. 2, the distance between the tip 20' and shelf tip 36' is defined as "S1," and the distance between the tip 20' and the bend plane 18 is defined as "B". Also, the distance between the tip 20' and the curvilinear base surface 26 is defined as "D". If S1 is set equal to or greater than B, then the shelf 30' will not be in a proper location to "catch" and remove the dust cut from the kerf wall 38. Specifically, a dust gap "DG" is defined between a lateral point 40' of the tooth 17' (which also establishes the kerf wall 38) and a side surface 42 at the base of the band saw blade 10. Effectively, the shelf 30' reduces the size of the dust gap or creates an effective dust gap "EDG" that is substantially less than DG.

It has been found that S1 preferably ranges from between approximately 0.06 inch and approximately 0.12 inch, and is most preferably approximately 0.09 inch, where B is approximately 0.20 inch and D is approximately 0.30 inch.

In order to quantify a percent reduction of the dust gap size, the ratio of S1/B is utilized. The present inventor has determined that the ratio of S1/B preferably ranges between approximately 0.25 and approximately 0.75, more preferably ranges between approximately 0.30 and approximately 0.60, and most preferably is approximately 0.45. Accordingly, a shelf depth of approximately ⅓ D (or approximately ½ the depth of the bend plane) is sufficient to prevent choking and provide a desirable effective dust gap. It will be understood that these dimensional parameters apply to straight or unset teeth as well as to set teeth.

It also will be appreciated that the width of the effective dust gap can not only be manipulated by adjusting the depth (dimension S1) of the shelf, but also by adjusting the set angle A' of the tooth 17'. For example, increasing the set angle A' relative to the transverse axis T, as illustrated in FIG. 2, will necessarily reduce the width of the effective dust gap.

The configuration of the shelf 30' also influences the ability of the shelf to remove dust. For example, it will be recognized that the available space created by the length of the shelf surface 34' must be sufficient to prevent dust from "choking" or over-filling the shelf. With reference to FIG. 1, it has been found that the length "L1" of the shelf surface 34' is preferably between approximately 0.06 inch and approximately 0.10 inch, and most preferably is approximately 0.08 inch. The length L1 may be made between the projected intersection of the cutting surface 24' and shelf surface 34' and an outer edge of the shelf tip 36'.

The shelf surface 34, 34' also may be angled to optimize dust capture and prevent, e.g., choking as discussed above. In particular, by angling the shelf with respect to the back edge 16 of the blade, the quantity of sawdust captured and the re-direction of the chip flow, e.g., to the gullet 28 for sweeping the chips out of the kerf is increased. For example, while shelf surface 34, 34' may comprise a first portion 34a, 34'a that may be generally parallel to the back edge 16 of the band saw blade 10, a second portion 34b, 34'b is provided that is disposed at an angle "A1" relative to the back edge. Angle A1 is preferably between approximately 10° and approximately 20°, and is most preferably approximately 15° in the direction of the back edge. However, it will be understood that less preferably the shelf surface may be angled in a direction away from the back edge (not shown). Optionally, the first portion 34a, 34'a may be angled relative to the back edge 16 at between approximately 4° and approximately 10°, and most preferably approximately 7° (not shown).

Another embodiment of the band saw blade of the present invention is shown generally at 110 in FIG. 4. The band saw blade 110 is similar in many respects to the band saw blade 10 described above, and therefore like reference numerals preceded by the number 1 are used to indicate like elements.

In this embodiment, shelf surface 134 of the band saw blade 110 defines a generally planar configuration over substantially the entire shelf length, and a shelf surface angle A2 relative to the back edge 116 of between approximately 4° and approximately 10°, and most preferably approximately 7°.

Tests conducted cutting frozen cherry at a band speed of approximately 5500 feet per minute (FPM) and a board speed of approximately 65 FPM, using a band saw blade of the present invention being 1.348 inch high, by 0.042 inch thick and having 1 tooth per inch (TPI), was found to have a 70-90% weight percent reduction in residual saw dust on the finished boards as compared to cutting with a conventional band saw blade.

Figure 3:
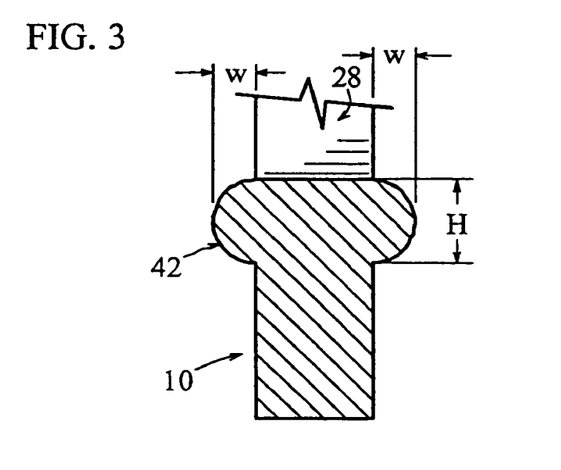
FIG. 3 is an enlarged cross-sectional view taken along line 3-3 of FIG. 1.

Referring now to FIGS. 1 and 3, the band saw blade 10 may also comprise a bump 42 that may function to urge chips received from a tooth 17' to be redirected toward the cutting edge 14 and out of the kerf. The bump preferably includes a height H that ranges from approximately 0.04 inch through approximately 0.06 inch, and a lateral width W which ranges from between approximately 0.005 inch to approximately 0.015 inch as measured from a respective side of the band saw blade 10. The bump 42 is preferably formed by swaging. It will be appreciated that swaging the bump (and by not locating the bump at the traditional location at the base of the rake face) substantially reduces the chances of the formation of harmful stress risers in the band saw blade 10.

Figure 5:
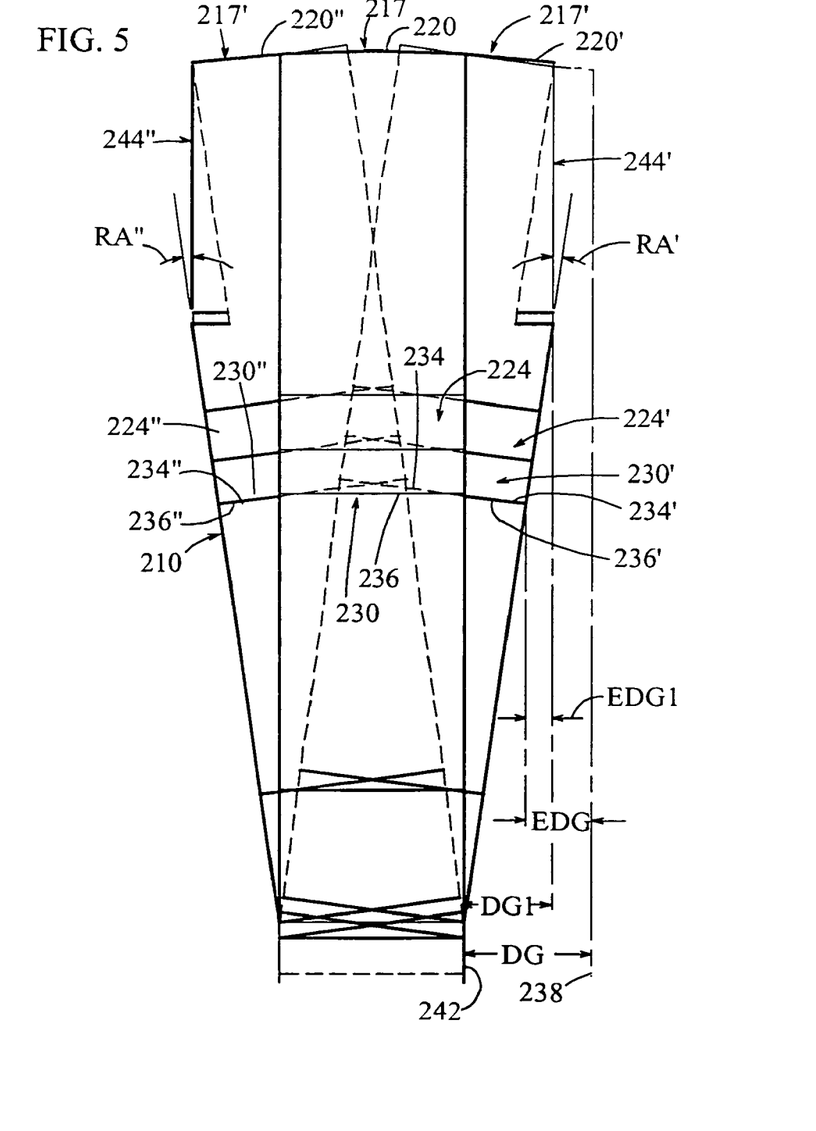
FIG. 5 is a somewhat schematic, cross-sectional view of another embodiment of the wood cutting band saw blade of the present invention wherein each set tooth includes a shelf and a relief portion to further reduce or minimize the dust gap between the blade and kerf walls.
Figure 6:
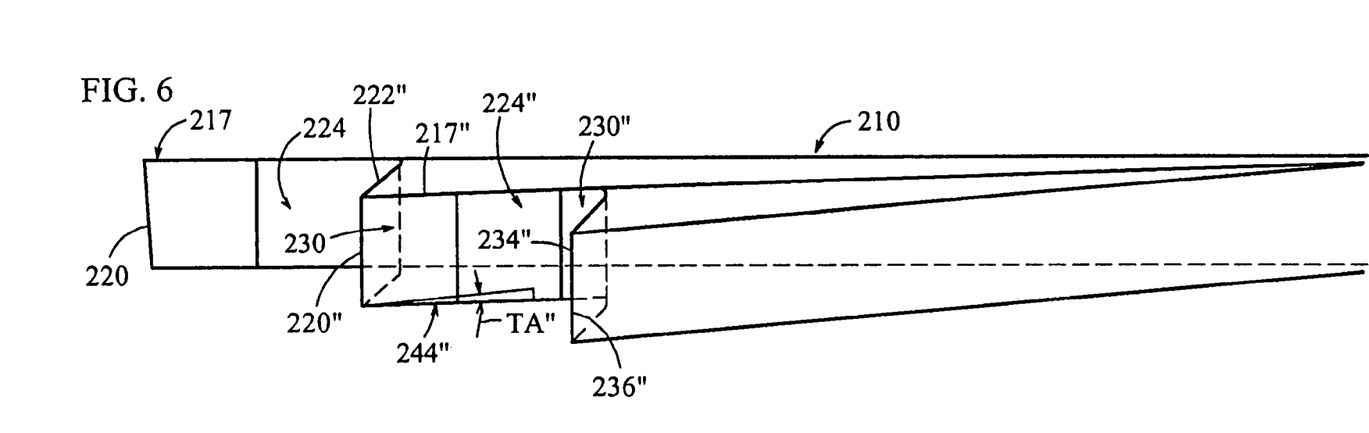
FIG. 6 is a somewhat schematic, partial top plan view of the band saw blade of FIG. 5.

Turning now to FIGS. 5 and 6, another embodiment of a band saw blade in accordance with the present invention is shown generally at 210. The band saw blade 210 is similar in many respects to the band saw blade 10 described above, and therefore like reference numerals preceded by the number 2 are used to indicate like elements. In this embodiment, each of the set teeth includes a shelf 230 and a relief portion to further reduce or minimize the dust gap between the blade 10 and the kerf walls (not shown).

The band saw blade 210 is generally similar to the band saw blade 10 of FIGS. 1-3; however, each set tooth 217', 217", etc. further includes a relief portion 244', 244", respectively, formed on the upper corner of the tooth on the side facing the respective kerf wall 238. As illustrated in FIG. 5, the relief portions 244', 244" each define a relief angle RA', RA" (shown in FIG. 5). The relief portions form an angle which is preferably within the range of between approximately 0° and approximately 2° with respect to a plane defined by the unset tooth 220. The relief portions 244', 244" function to locate the respective shelf 230 closer to the kerf wall 238 to thereby further reduce the dust gap DG to DG1 and, in turn, decrease the effective dust gap from EDG to EDG1. The relief portion may also define a tangential angle "TA" (shown in FIG. 6). In this way, the edge is relieved to reduce the effects of friction during cutting of a work piece (not shown). The angle TA is preferably within the range of between approximately 3° and approximately 6° with respect to a plane defined by the side of the blade body 210. It will be understood that the dimensions and interrelationship of S1 and B, as described above, applies to the current embodiment as well. The straight or unset tooth 220 provided in this embodiment also includes a shelf 230 similar to that described above.

Figure 7:
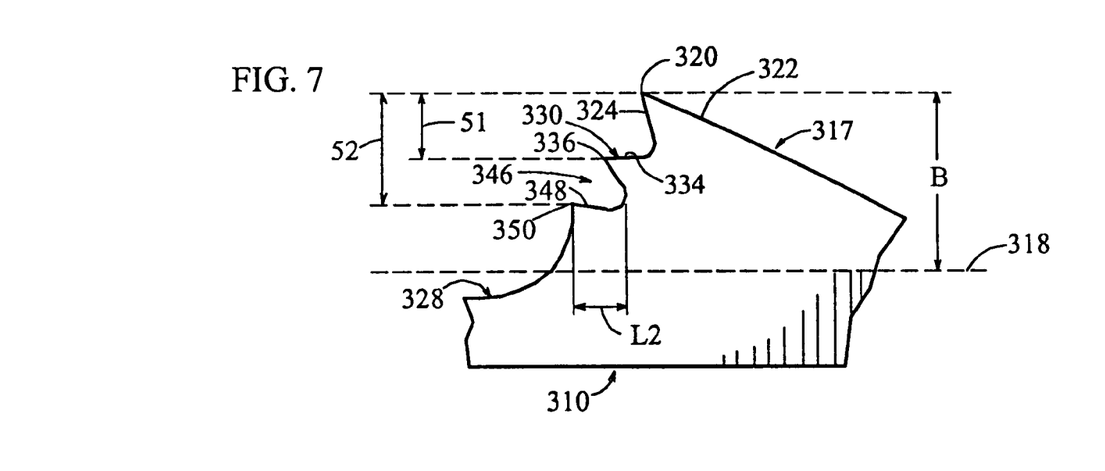
FIG. 7 is a side elevational view of a portion of a wood cutting band saw blade showing a single tooth having two shelves in accordance with another embodiment of the present invention.

FIG. 7 illustrates a band saw blade 310 in accordance with another embodiment of the present invention. The band saw blade 310 is similar in many respects to the band saw blade 10 described above, and therefore like reference numerals preceded by the number 3 are used to indicate like elements. The tooth 317 may be similar to teeth 17, 17', 17" and 117 described above in conjunction with FIGS. 1-3 and 5, although, the tooth 317 further includes a second shelf 346. The second shelf 346 comprises a second shelf surface 348 and a second shelf tip 350, and functions to re-direct chips which have passed the first shelf 330. Each second shelf 346 has a dimension S2 which is defined as the distance measured between the tip 320 of a particular tooth 317 and the second shelf tip 350. The dimensions S1 and B may both be determined in the same manner as discussed above in conjunction with FIGS. 1 and 2. It has been found that S2 is preferably determined through the relationship of S2=(B+S1)÷2. Accordingly, for the range of S1 given above, S2 preferably is within the range of between 0.13 inch and 0.16 inch, and is most preferably 0.145 inch. It has been found that the shelf length L2 (measured in a similar manner to L1) is preferably approximately 70% to approximately 90% of L1. Most preferably, the shelf length L2 is approximately 80% of L1.

In the operation of the band saw blade, the shelf operates to collect substantially all of the sawdust generated upon cutting the work piece and tends to force the collected dust upwardly and out of the kerf. As a result, very little dust is allowed to fall downwardly into the dust gap formed between the sides of the blade and kerf walls. Also, a substantial clearance is maintained between the base of the blade and the kerf walls, thereby significantly reducing friction between the blade and kerf walls and, in turn, minimizing vibrations and increasing blade life in comparison to prior art band saw blades.

As may be recognized by those of ordinary skill in the pertinent art based on the teachings herein, numerous changes and modifications may be made to the above-described and other embodiments of the present invention without departing from its scope as defined in the appended claims. For example, the shelf or similarly functioning means, may take various different configurations while still performing the function of reducing the passage of saw dust into the kerf. In addition, the blade need not define any unset teeth; rather all teeth may alternate from one side of the transverse axis of the blade to the other. Accordingly, this detailed description of preferred embodiments is to be taken in an illustrative as opposed to a limiting sense.

What is claimed is:

1. A wood cutting band saw blade that when cutting wood produces saw dust and forms a kerf, comprising:
a cutting edge defined by a plurality of teeth spaced relative to each other, and a back edge including a substantially planar portion located on an opposite side of the band saw blade relative to the cutting edge, the plurality of teeth comprising a plurality of set teeth, each set tooth defining a tip, a bend plane from which the set tooth is set, the bend plane extending substantially parallel to the substantially planar back edge portion of the band saw blade, and a shelf located on a front portion of each set tooth with respect to a cutting direction of the band saw blade and exposed during cutting, the shelf located at least partially between the tip and the bend plane for reducing saw dust passing to the kerf and accumulating on the band saw blade, wherein at least a portion of the shelf is planar and extends substantially parallel to the substantially planar back edge portion or is planar and extends at an angle in a direction that is opposite the cutting direction and generally toward the back edge of the band saw blade.

2. The band saw blade of claim 1 wherein:
each of the set teeth comprises a relief surface and a cutting surface, the relief surface extending from one side of the tip in a direction opposite that of movement of the band saw blade and terminating at one end of an intermediate surface, and the cutting surface extending from another side of the tip; and
the shelf comprises a shelf surface extending from the cutting surface and terminating at another end of the intermediate surface.

3. The band saw blade of claim 2 wherein the shelf surface terminates in a shelf tip.

4. The band saw blade of claim 2 wherein a length (L1) of the shelf surface defined between the cutting surface and the intermediate surface is within the range of approximately $6/100$ inch to approximately $1/10$ inch.

5. The band saw blade of claim 4 wherein each of the plurality of set teeth comprises a second shelf; and a length (L2) of a surface of each second shelf is within the range of approximately 70% to approximately 90% of (L1).

6. The band saw blade of claim 5 wherein the length (L2) of the surface of each second shelf is approximately 80% of (L1).

7. The band saw blade of claim 2 wherein the intermediate surface comprises a curvilinear base surface that defines a gullet.

8. The band saw blade of claim 7 further comprising at least one bump portion extending outwardly from a surface of the gullet.

9. The band saw blade of claim 8 wherein the at least one bump portion comprises a bump portion extending outwardly from a first side surface and a second side surface of the gullet.

10. The band saw blade of claim 8 wherein the at least one bump portion has a height (H) within the range of approximately 0.04 to approximately 0.06 inch from the curvilinear base surface.

11. The band saw blade of claim 10 wherein the bump portion has a lateral width (W) as measured from a side surface of a base of the band saw blade that is within the range of approximately 0.005 inch to approximately 0.015 inch.

12. The band saw blade of claim 7 wherein the gullet has a depth (D) as measured from the tip of a tooth and each of the set teeth has a dimension (S1) defined as the distance between the tip and the shelf of the respective set tooth and the dimension (S1) is approximately one third of (D).

13. The band saw blade of claim 1 wherein:
the at least a portion of the shelf comprises a shelf surface that extends at an angle (A1), wherein the angle is within the range of approximately 4° to approximately 10° relative to the substantially planar back edge portion of the band saw blade.

14. The band saw blade of claim 13 wherein the angle (A1) is approximately 7°.

15. The band saw blade of claim 1 wherein at least one tooth comprises a relief portion extending from the tip and having a relief angle (RA) within the range of approximately 0° to approximately 2° with respect to a plane defined by a side of an unset tooth.

16. The band saw blade of claim 15 wherein the relief portion also defines a tangential angle (TA) within the range of approximately 3° to approximately 6° with respect to a side of the blade.

17. The band saw blade of claim 1 wherein the plurality of teeth further comprise a plurality of unset teeth and wherein:
the plurality of teeth have a repeating pattern of one unset tooth and four set teeth; and
the set teeth are alternately set in directions on opposing sides of the cutting edge.

18. The band saw blade of claim 1, wherein the at least a portion of the shelf extends substantially parallel to the substantially planar back edge portion.

19. A wood cutting band saw blade that when cutting wood produces saw dust and forms a kerf, comprising:
a cutting edge defined by a plurality of teeth spaced relative to each other, and a back edge including a substantially planar portion located on an opposite side of the band saw blade relative to the cutting edge, the plurality of teeth comprising a plurality of set teeth, each set tooth defining a tip, a bend plane from which the set tooth is set, the bend plane extending substantially parallel to the substantially planar back edge portion of the band saw blade, and a shelf located on a front portion of each set tooth with respect to a cutting direction of the band saw blade and exposed during cutting, the shelf located at least partially between the tip and the bend plane and at least a portion of the shelf being planar and extending substantially parallel to the substantially planar back edge portion being planar and extending at an angle in a direction that is opposite the cutting direction and generally toward the back edge of the band saw blade for reducing saw dust passing to the kerf and accumulating on the band saw blade, wherein:
each of the set teeth has a dimension (S1) defined as the distance between the tip and the shelf of the respective set tooth;
each of the set teeth has a dimension (B) defined as the distance between the tip and the bend plane of the respective set tooth; and
a ratio of S1/B is within the range of approximately $1/4$ to approximately $3/4$.

20. The band saw blade of claim 19 wherein the ratio of S1/B is approximately $45/100$.

21. The band saw blade of claim 19 wherein:
each of the teeth is set at an angle which is in the range of between approximately 1° and approximately 15° with respect to a transverse axis of the band saw blade; and
the dimension (S1) is within the range of approximately $6/100$ inch to approximately $12/100$ inch.

22. The band saw blade of claim 21 wherein the dimension (S1) is approximately $9/100$ inch.

23. The band saw blade of claim 19 wherein:
the plurality of set teeth each comprises a second shelf;
each second shelf comprises a second shelf surface, and each second shelf defines a dimension (S2) extending between the tip of the respective set tooth and the second shelf.

24. The band saw blade of claim 23 wherein S2=(B+S1)/2 and S1 is within the range of between approximately $13/100$ inch and approximately $16/100$ inch.

25. The band saw blade of claim 19, wherein the at least a portion of the shelf extends substantially parallel to the substantially planar back edge portion.

26. A wood cutting band saw blade that when cutting wood produces saw dust and forms a kerf, comprising:
a cutting edge defined by a plurality of teeth spaced relative to each other, and a back edge including a substantially planar back edge portion located on an opposite side of the band saw blade relative to the cutting edge, the plurality of teeth comprising a plurality of set teeth, each set tooth defining a tip, a bend plane from which the set tooth is set, the bend plane extending substantially parallel to the substantially planar back edge portion of the band saw blade, and a shelf located on a front portion of each set tooth with respect to a cutting direction of the band saw blade and exposed during cutting, the shelf located at least partially between the tip and the bend plane for reducing saw dust passing to the kerf and accumulating on the band saw blade; wherein each of the set teeth comprises a relief surface and a cutting surface, the relief surface extending from one side of the tip in a direction opposite that of the cutting direction of the band saw blade and terminating at one end of an intermediate surface, and the cutting surface extending from another side of the tip;

the shelf comprises a shelf surface extending from the cutting surface and terminating at another end of the intermediate surface; and the shelf surface comprises a first portion that is planar and generally parallel to the substantially planar back edge portion and a second planar portion that is disposed at an acute shelf surface angle that extends in a direction opposite the cutting direction and generally toward the back edge of the band saw blade.

27. The band saw blade of claim 26 wherein the shelf surface angle is within the range of approximately 10° to approximately 20°.

28. The band saw blade of claim 26 wherein:
the second portion comprises about one third of the length of the shelf surface; and the shelf surface angle is approximately 15°.

29. A wood cutting band saw blade that generates dust during cutting of wood, the band saw blade comprising:
a base having a back edge including a substantially planar portion;
a cutting edge defined by a plurality of teeth spaced relative to each other and being located on an opposite side of the band saw blade relative to the back edge, the plurality of teeth comprising a plurality of set teeth, each set tooth defining a tip, a bend plane from which the set tooth is set, the bend plane extending substantially parallel to the substantially planar back edge portion of the band saw blade, a dust gap extending approximately between an outer lateral point of the tip and a lateral surface of the base, and means for reducing the quantity of dust passing through the dust gap and accumulating on the band saw blade, the reducing means being located on a front portion of each set tooth with respect to a cutting direction of the band saw blade and exposed during cutting, and being located between the tip of each set tooth and the bend plane, wherein at least a portion of the reducing means is planar and extends substantially parallel to the substantially planar back edge portion or is planar and extends at an angle in a direction that is opposite the cutting direction and generally toward the back edge of the band saw blade.

30. The band saw blade of claim 29 wherein the means for reducing the quantity of dust comprises at least one shelf.

31. The band saw blade of claim 30 wherein the means for reducing the quantity of dust further comprises a relief portion extending from the tip of the respective set tooth at an acute angle to a transverse axis of the saw blade.

32. The band saw blade of claim 30 wherein:
each of the set teeth comprises a relief surface and a cutting surface, the relief surface extending from one side of the tip in a direction opposite the cutting direction of the band saw blade and terminating at one end of an intermediate surface, and the cutting surface extending from another side of the tip; and the shelf comprises a shelf surface extending from the cutting surface and terminating at another end of the intermediate surface.

33. The band saw blade of claim 29 wherein the means for reducing the quantity of dust passing through the dust gap and accumulating on the band saw blade includes a relief portion defining a substantially flat surface formed on an upper corner of the respective set tooth on an outer side of the set tooth, wherein the relief portion extends from the tip of the respective set tooth and is oriented at an acute angle with respect to a plane defined by the remaining portion of the respective side of the set tooth for reducing an effective dust gap of the set tooth.

34. The band saw blade as defined in claim 33 wherein the relief portion is oriented at a relief angle (RA) within the range of approximately 0° to approximately 2° with respect to a plane defined by a side of an unset tooth.

35. The band saw blade of claim 29, wherein the at least a portion of the reducing means extends substantially parallel to the substantially planar back edge portion.

36. A wood cutting band saw blade that generates dust during cutting of wood, the band saw blade comprising:
a base having a back edge including a substantially planar portion;
a cutting edge defined by a plurality of teeth spaced relative to each other and being located on an opposite side of the band saw blade relative to the back edge, the plurality of teeth comprising a plurality of set teeth, each set tooth defining a tip, a bend plane from which the set tooth is set, the bend plane extending substantially parallel to the substantially planar back edge portion of the band saw blade, and first means for reducing saw dust passing to a kerf and accumulating on the band saw blade, the first means being located on a front portion of each set tooth with respect to a cutting direction of the band saw blade and exposed during cutting, and being located at least partially between the tip and the bend plane, and at least a portion of the first means being planar and extending substantially parallel to the substantially planar back edge portion or at least a portion of the first means being planar and extending at an angle in a direction that is opposite the cutting direction and generally toward the back edge of the band saw blade, wherein:
each of the set teeth has a dimension (S1) defined as the distance between the tip and said first means of the respective set tooth;
each of the set teeth has a dimension (B) defined as the distance between the tip and the bend plane of the respective set tooth; and
a ratio of S1/B is within the range of approximately ¼ to approximately ¾.

37. The band saw blade of claim 36 wherein:
the plurality of set teeth each comprises second means for reducing saw dust passing to the kerf and accumulating on the band saw blade;
each second means defines a dimension (S2) extending between the tip of the respective set tooth and the second means.

38. The band saw blade of claim 37 wherein S2=(B+S1)/2 and S1 is within the range of between approximately 13/100 inch and approximately 16/100 inch.

39. The band saw blade of claim 36, wherein the first means for reducing saw dust passing to the kerf and accumulating on the band saw blade comprises at least one shelf.

40. The band saw blade of claim 36, wherein the at least a portion of the first means extends substantially parallel to the substantially planar back edge portion.

41. A wood cutting band saw blade that generates dust during cutting of wood, the band saw blade comprising:
a base having a back edge including a substantially planar portion;
a cutting edge defined by a plurality of teeth spaced relative to each other and being located on an opposite side of the band saw blade relative to the back edge, the plurality of teeth comprising a plurality of set teeth, each set tooth defining a tip, a bend plane from which the set tooth is set, the bend plane extending substantially parallel to the substantially planar back edge portion of the band saw blade, a dust gap dimension extending approximately between an outer lateral point of the tip and a lateral surface of the base, and means for effectively reducing the dust gap dimension, the reducing means being located on a front portion of each set tooth with respect to a cutting direction of the band saw blade and exposed during cutting, and being located between the tip of each set tooth and the bend plane, wherein at least a portion of the reducing means is planar and extends parallel to the substantially planar back edge portion or is planar and extends at an angle in a direction that is opposite the cutting direction and generally toward the back edge of the band saw blade.

42. The band saw blade of claim 41 wherein the means for effectively reducing the dust gap dimension comprises at least one shelf.

43. The band saw blade of claim 42 wherein the means for effectively reducing the dust gap dimension further comprises a relief portion extending from the tip of the respective set tooth at an acute angle to a transverse axis of the saw blade.

44. The band saw blade of claim 42 wherein:
each of the set teeth comprises a relief surface and a cutting surface, the relief surface extending from one side of the tip in a direction opposite the cutting direction of the band saw blade and terminating at one end of an intermediate surface, and the cutting surface extending from another side of the tip; and
the shelf comprises a shelf surface extending from the cutting surface and terminating at another end of the intermediate surface.

45. The band saw blade of claim 41, wherein the at least a portion of the reducing means extends substantially parallel to the substantially planar back edge portion.

46. A wood cutting band saw blade that generates dust during cutting of wood, the band saw blade comprising:
a base having a back edge including a substantially planar portion;
a cutting edge defined by a plurality of teeth spaced relative to each other and being located on an opposite side of the band saw blade relative to the back edge, the plurality of teeth comprising a plurality of set teeth, each set tooth defining a tip, a bend plane from which the set tooth is set, the bend plane extending substantially parallel to the substantially planar back edge portion of the band saw blade, and a shelf being located on a front portion of each set tooth with respect to a cutting direction of the band saw blade and exposed during cutting, and being located at least partially between the tip and the bend plane, and at least a portion of the shelf being planar and extending substantially parallel to the substantially planar back edge portion or being planar and extending at an angle in a direction that is opposite the cutting direction and generally toward the back edge of the band saw blade for reducing saw dust passing to a kerf and accumulating on the band saw blade, wherein:
each of the set teeth has a dimension (S1) defined as the distance between the tip and the shelf of the respective set tooth;
each of the set teeth has a dimension (B) defined as the distance between the tip and the bend plane of the respective set tooth; and
a ratio of S1/B is within the range of approximately ¼ to approximately ¾.

47. The band saw blade of claim 46 wherein:
the plurality of set teeth each comprises a second shelf;
each second shelf comprises a second shelf surface, and each second shelf defines a dimension (S2) extending between the tip of the respective set tooth and the second shelf.

48. The band saw blade of claim 47 wherein S2=(B+S1)/2 and S1 is within the range of between approximately 13/100 inch and approximately 16/100 inch.

49. The band saw blade of claim 46, wherein the at least a portion of the shelf extends substantially parallel to the substantially planar back edge portion.

* * * * *